Patented Apr. 22, 1930

1,755,512

UNITED STATES PATENT OFFICE

REGINALD HILL MONK, OF MONTREAL, QUEBEC, CANADA, ASSIGNOR OF ONE-HALF TO JOHN IRWIN, OF MONTREAL, QUEBEC, CANADA

PRODUCTION OF AMPHOTERIC HYDRATED OXIDES OF METALS BY HYDROLYSIS

No Drawing. Application filed February 18, 1929. Serial No. 341,034.

It has been shown by Von Weimarn (see "Principles of Physical Chemistry" by Washburn, chapter 25) that the degree of dispersion and general physical characteristics of a precipitate are always the same irrespective of the chemical nature of the substances, provided that the substances are precipitated under "corresponding conditions."

For simple substances precipitation under "corresponding conditions" means that the ratio $\frac{Np}{Sp}$ is the same, where $Sp$ is the solubility in equivalents per litre of the precipitated substance and $Np$ is the number of equivalents of the precipitate which must be deposited out of each litre of the solution in order that its concentration shall be reduced to $Sp$ equivalents per litre.

In other words the form of precipitate obtained will depend on the ratio of $Np$ to $Sp$ or on the degree of supersaturation of the solution.

If the degree of supersaturation is very small, the precipitate will settle out very slowly and colloidal solutions will be obtained. This is the case where hydrated oxides of metals are prepared by hydrolysis. The rate of crystallization of the hydrated oxide is usually the same as the rate of hydrolysis. The solution is consequently never very much supersaturated and hence the precipitate has very small particles.

On the other hand if the precipitate of hydrated oxides is prepared by the addition of alkali to a solution, any concentration of solution which can be used in practice will result in the production of an extremely high degree of supersaturation and will lead in most cases to the formation of a gel, or a gelatinous precipitate.

A precipitate having the desired characteristics may be obtained by adjusting the concentrations so that the degree of supersaturation is intermediate between the two cases given above, but this necessitates the use of solutions far too dilute to be practical.

According to this invention, amphoteric hydrated oxides of metals of Group IV of the periodic table are prepared by adding to a solution of a salt of the metal to be hydrolyzed a small amount of an oxide of the same metal, which was previously prepared by a method other than hydrolysis and preferably by an alkaline compound. The added oxide redissolves readily, but before doing so provides a very large number of nuclei, around which the hydrolyzed hydrated oxide crystallizes, producing a large number of particles of hydrated oxide having different physical characteristics from the usual hydrolyzed precipitate. These particles then influence in a similar manner the precipitation of the remainder of the hydrated oxide as it is formed with the result that a homogeneous precipitate is formed which may be easily washed and separated by settling.

The previously prepared hydrated oxide to be added to the solution may, for example, be precipitated by means of an alkaline substance such as ammonia or sodium carbonate.

For example in the production of hydrated zirconium oxide having the desired physical characteristics which permit ready washing and separation, there is added to a solution of zirconium sulphate, sodium carbonate to precipitate zirconium oxide. This precipitated zirconium oxide is then added to zirconium sulphate solution and the whole may be heated to hasten the hydrolysis and the precipitation of hydrated zirconium oxide in the manner described. The precipitate thus obtained will settle readily and in a fraction of the time required for the settling of precipitates obtained by hydrolysis by previously known methods.

Other amphoteric hydrated oxides having the desired characteristics may be produced in the manner specifically described and the example given is by way of illustration and not limitation.

We claim:

1. In the manufacture of amphoteric hydrated oxides of metals by hydrolysis, the improvement which consists in adding to a solution of a salt of the metal to be hydrolyzed a small amount of an oxide of the metal previously prepared in a manner other than by hydrolysis for the purpose set forth.

2. In the manufacture of amphoteric hydrated oxides of metals by hydrolysis, the process which comprises adding to a solution of a salt of the metal to be hydrolyzed a small amount of an oxide of said metal previously precipitated by means of an alkaline compound.

3. In the manufacture of amphoteric hydrated oxides of metals by hydrolysis, the process which comprises adding to a solution of a salt of the metal to be hydrolyzed a small amount of an oxide of said metal previously precipitated with sodium carbonate.

4. In the production of hydrated zirconium oxide by hydrolysis, the process which comprises adding to a solution of a zirconium salt a small amount of zirconium oxide precipitated by means of an alkaline compound.

5. In the production of hydrated zirconium oxide by hydrolysis, the process which comprises adding to a solution of a zirconium salt a small amount of zirconium oxide precipitated by means of sodium carbonate and heating the mixture to hasten the hydrolysis and the precipitation of the hydrated zirconium oxide of the character disclosed.

In testimony whereof I have affixed my signature.

REGINALD HILL MONK.